US008161792B2

(12) United States Patent  (10) Patent No.: US 8,161,792 B2
Schlueter et al.  (45) Date of Patent: Apr. 24, 2012

(54) METHOD AND APPARATUS FOR ASSESSING THE GENTLENESS OF BRUSHES

(75) Inventors: Carolin Schlueter, Frankfurt (DE); Joachim Wilhelm, Eschborn (DE)

(73) Assignee: Braun GmbH, Kronberg (DE)

( * ) Notice: Subject to any disclaimer, the term of this patent is extended or adjusted under 35 U.S.C. 154(b) by 277 days.

(21) Appl. No.: 12/748,986

(22) Filed: Mar. 29, 2010

(65) Prior Publication Data

US 2011/0232361 A1 Sep. 29, 2011

(51) Int. Cl.
*G01N 3/56* (2006.01)
(52) U.S. Cl. .............................................. 73/7
(58) Field of Classification Search ................ 73/7
See application file for complete search history.

(56) References Cited

U.S. PATENT DOCUMENTS

| 2,153,294 A | * | 4/1939 | Brogden | 15/88.3 |
| 3,961,521 A | * | 6/1976 | Bailey et al. | 73/7 |

FOREIGN PATENT DOCUMENTS

JP 2002 112837 4/2002

OTHER PUBLICATIONS

"High and low brushing force in relation to efficacy and gingival abrasion" G. A. Van der Weijden et al., Journal of Clinical Periodontology, Accepted for publication Oct. 9, 2003, pp. 620-624.
"Toothbrush filaments end-rounding: stereomicroscope analysis" L. Checchi et al., Journal of Clinical Periodontology, Accepted for publication Jun. 6, 2000, pp. 360-364.
"Evaluation of the incidence of gingival abrasion as a result of toothbrushing" M.M. Danser et al., Journal of Clinical Periodontology, Accepted for publication Dec. 22, 1997, pp. 701-706.
Dr. Best Tomato TV Commercial located at http://www.youtube.com/watch?v=qkugFArS1qE, (Nov. 2007).
Dr. Best Tomato TV Commercial (in mpg format on the attached DVD).
L.M. Silverstone & M.J. Faetherstone, (1988), A scanning electron microscope study of the end rounding of bristles in eight toothbrush types. Journal: Quintessence International, vol. 19, No. 2, p. 87-107.
C. Reiter & W.E. Wetzel, (1991), Bearbeitung der Borstenenden bei Interdentalbursten (the finishing of the bristle ends in interdental brushes). Journal: Schweiz Monatsschr. Zahnmed. vol. 104 No. 4, p. 431-437. Samuel L. Yankell et al.: "Evaluating cleaning efficiency of different toothbrush designs and textures" Journal of the Society of Cosmetic Chemists, vol. 34, No. 3, Jan. 1, 1983, pp. 151-157.
Dyer et al.: "Abrasion and stain removal by different manual toothbrushes and brush actions: studies in vitro", Journal of Clinical Periodontology, Blackwell Munksgaard, Copenhagen, DK, Jan. 1, 2001, pp. 121-127.
PCT International Search Report dated Jul. 26, 2011.

* cited by examiner

*Primary Examiner* — John Fitzgerald
(74) *Attorney, Agent, or Firm* — David M. Weirich

(57) ABSTRACT

A method and apparatus for assessing the abrasiveness of a brush is provided. The method includes providing a destructible article, providing a brush, such as for example a toothbrush, brushing the destructible article with the toothbrush, examining the destructible article after brushing with the toothbrush and determining the abrasive quality of the toothbrush as a function of the appearance of the destructible article. The apparatus for determining the abrasiveness of a toothbrush includes a holder for retaining a toothbrush having a head and a neck, a support for holding a destructible article, a mechanism for moving the head of the toothbrush against the destructible article in a brushing fashion, and a biasing member for applying a selected brushing force between the head of the toothbrush and the destructible article.

8 Claims, 5 Drawing Sheets

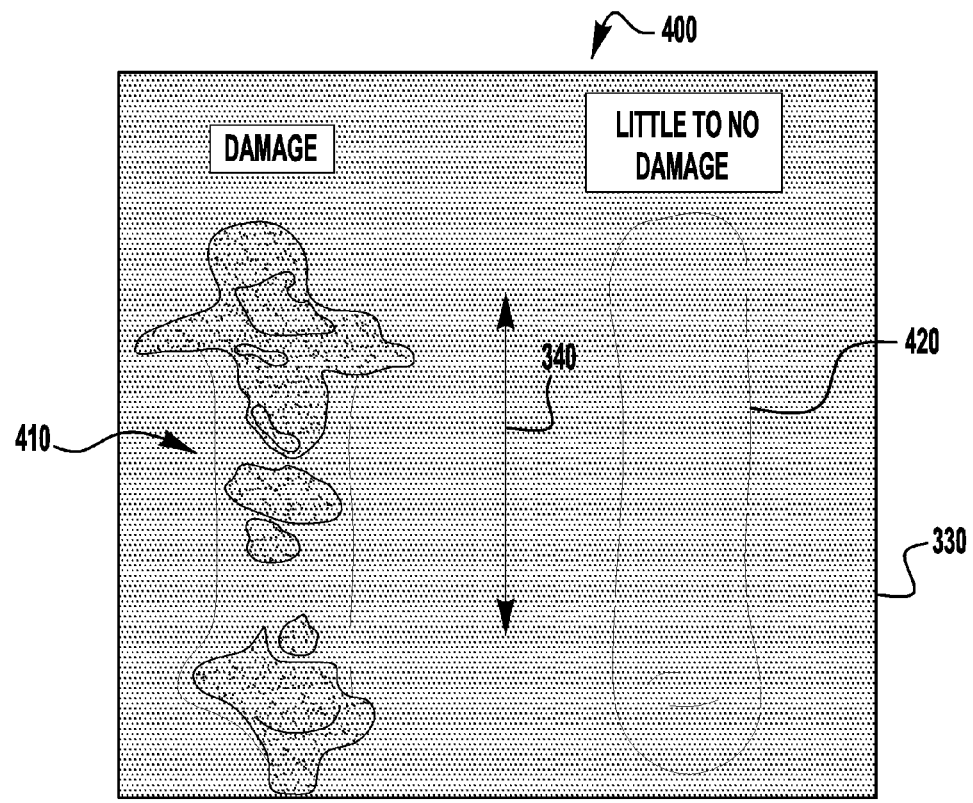
FIG. 4
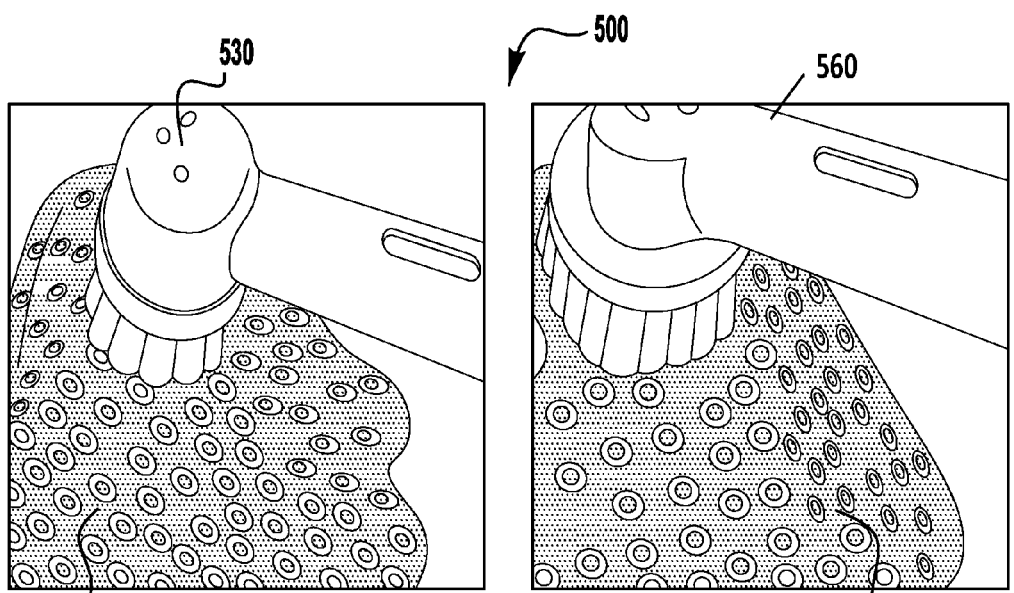
FIG. 5A     FIG. 5B

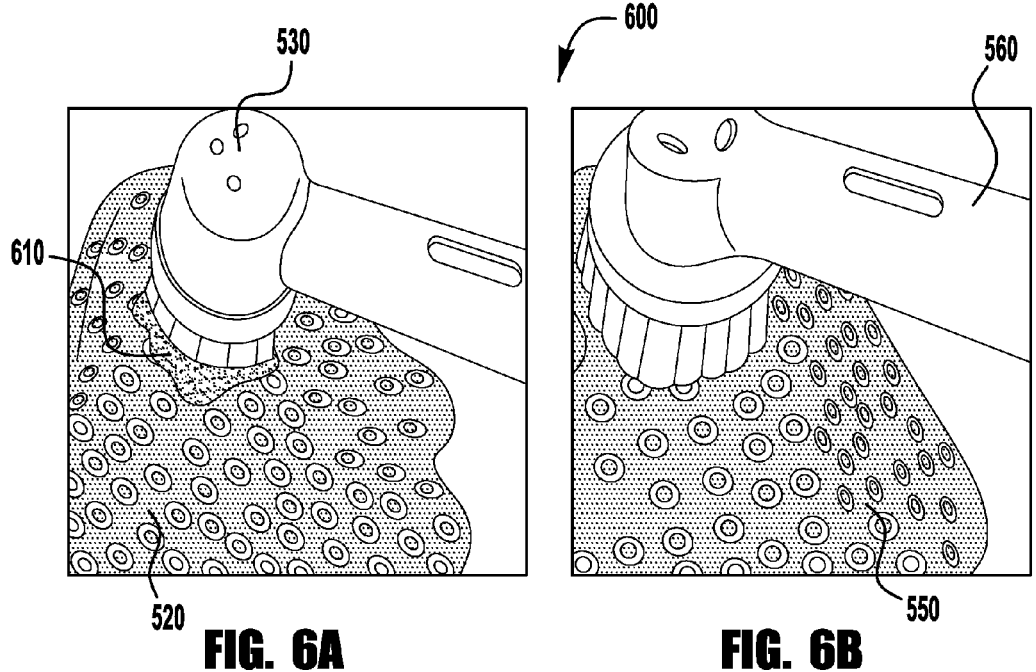
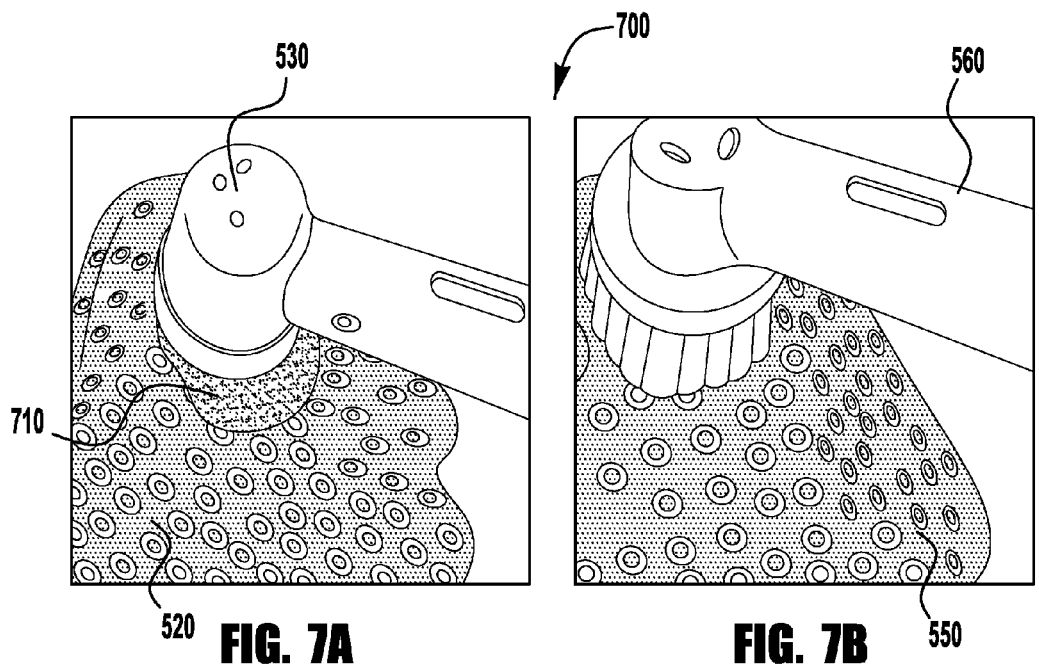

METHOD AND APPARATUS FOR ASSESSING THE GENTLENESS OF BRUSHES

FIELD OF THE INVENTION

This invention relates to a method and apparatus for assessing the gentleness, or conversely the abrasiveness, of a brush. It may be used to assess the abrasive effect of the bristles or other cleaning elements of a brush. In addition, the abrasive effect of many different properties of a set of other cleaning elements or brush bristles, such as the endrounding of bristle filaments, may be assessed. This invention finds a particularly useful application in assessing toothbrush head characteristics and more particularly in assessing toothbrush bristle characteristics.

BACKGROUND OF THE INVENTION

Toothbrushes typically have a head with a plurality of tooth cleaning elements, such as for example bristle filaments and elastomeric elements, attached to the head for cleaning teeth, removing bacterial plaque, and stimulating gums. It is desirable to have a toothbrush that removes plaque and is gentle on the soft tissue in the oral cavity. There are a number of tests to assess the amount of plaque removed by a toothbrush, however, there are no well-known defined objective tests for determining the gentleness of a toothbrush.

In addition, certain tooth cleaning elements are more gentle than others. For example, toothbrush bristle filaments with acceptably rounded ends allow for efficient removal of bacterial plaque and are less harmful to soft tissue in the oral cavity than non-rounded bristle filaments, or poorly rounded bristle filaments. Studies have shown that gingival abrasion is affected by filament endrounding. Assessment of endrounding on toothbrush bristle filaments is typically conducted through microscopy and visually comparing the magnified images of test bristle filaments to bristle filaments having known shapes and degrees of endrounding. Microscopy is labor intensive and time consuming because toothbrushes often have over a thousand bristle filaments. In addition, microscopy cannot effectively visually demonstrate the gentleness of the toothbrush to a consumer.

SUMMARY OF THE INVENTION

A method of assessing the abrasiveness of a brush, such as a toothbrush, is provided. The method includes providing a destructible article, providing a toothbrush, brushing the destructible article with the toothbrush, examining the destructible article after brushing with the toothbrush and determining the abrasive quality of the toothbrush as a function of the appearance of the destructible article.

A method of demonstrating the gentleness of a brush, such as a toothbrush, is also provided. The method includes providing a destructible article, providing a toothbrush, brushing the destructible article with the toothbrush for a period of time, and providing a visual display of the destructible article.

A method of comparing a first toothbrush with a second toothbrush is provided. The method includes providing a first toothbrush, a second toothbrush and a destructible article. The method includes brushing the destructible article with the first toothbrush for a period of time under a set force and obtaining a first result. The method further includes brushing the destructible article with the second toothbrush for the same period of time under the same set force and obtaining a second result, and comparing the first result to the second result.

An apparatus for determining the abrasiveness of a brush, such as a toothbrush, is provided. The apparatus includes: a holder for holding a toothbrush having a head, a neck, and a handle, a support for holding a destructible article, a mechanism for moving the holder to apply the brush head to a destructible article secured to the support with a brushing force, a sensor secured to the support or to the mechanism to measure the brushing force being applied by the brush head against the destructible article, and a controller configured to receive a signal indicative of the brushing force being applied by the brush head against the destructible article and output a control signal to the mechanism for moving the holder to maintain a selected brushing force.

Other features and advantages of the invention will be apparent from the description and drawings, and from the claims.

BRIEF DESCRIPTION OF THE DRAWINGS

FIG. 4 is a plan view of the destructible article of FIG. 3 after brushing with the two toothbrushes, illustrating a first portion damaged by brushing with the first toothbrush having abrasive bristle filaments and a second portion that is not damaged by brushing with the second toothbrush having less abrasive bristle filaments;

FIGS. 5A, 6A, 7A, and 8A are snap-shots at various time intervals of a first toothbrush brushing a first strawberry FIGS. 5B, 6B, 7B, and 8B are snap-shots at the same time intervals (as FIGS. 5A, 6A, 7A and 8A respectively) of a second toothbrush brushing a second strawberry;

DETAILED DESCRIPTION OF THE INVENTION

Toothbrushes often have a plurality of tooth cleaning elements secured to the head of the toothbrush. These tooth cleaning elements may include, for example, bristles, elastomeric elements, pivotal elements etc. The plurality of tooth cleaning elements on a toothbrush may include a single type of tooth cleaning element or combinations of different types of tooth cleaning elements. Furthermore, a particular type of tooth cleaning element may have several different forms and/or different properties, such as for example, different thickness, stiffness, mounting angle, length and composition. In addition, the tooth cleaning elements may be grouped into a wide variety of configurations, such as for example bristle tufts, elongated bristle tufts, sets of elastomeric fins, or elastomeric elements with a variety of different sizes and shapes of wiping edges. Although embodiments described in detail below may describe toothbrushes having bristle filaments, the claimed methods and apparatuses may be used to evaluate the gentleness of brushes with any type of cleaning elements, or combinations thereof.

Figure 1:
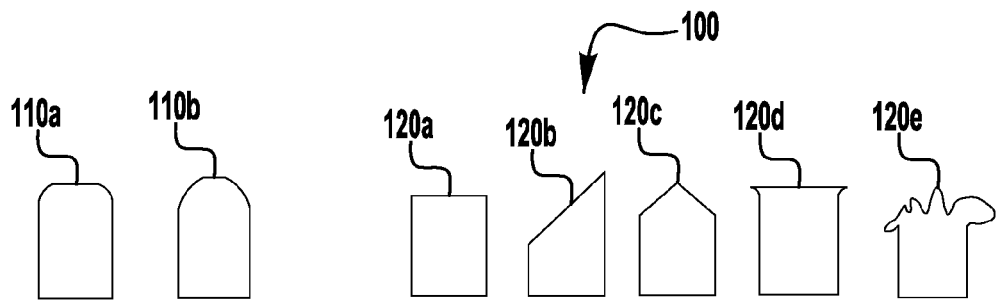
FIG. 1 is an exemplary illustration of enlarged views of endrounding on a plurality of bristle filaments.

Toothbrush bristle filaments with a higher quality of endrounding tend to be more gentle to the soft tissue in the oral cavity than bristle filaments with a lower quality of endrounding. FIG. 1 illustrates enlarged views of the ends of a plurality of bristle filaments 100. Among the plurality of bristle filaments 100, bristle filaments 110a and 110b tend to have generally acceptable endrounding. The endrounding of bristle filaments 110a and 110b is generally acceptable because they have smooth rounded ends. In contrast, bristle filaments 120a, 120b, 120c, 120d and 120e have less desirable, or even unacceptable endrounding characteristics. These bristle filaments are less desirable or are unacceptable because they have sharp, pointed, or jagged edges. For additional information on generally acceptable end rounding, see, e.g. Silverstone, L. M. & Featherstone, M. J. (1988), *A scanning electron microscope study of the end rounding of bristles in eight toothbrush types. Journal: Quintessence International*, volume 19, No. 2, pp. 87-107; Reiter, C. & Wetzel, W.-E. (1991), *Abteilung Kinderzahnheilkunde, Zentrum für Zahn-, Mund-und Kieferheilkunde, Giessen* (*The finishing of the bristle ends in interdental brushes*), *Schweiz Monatsschr Zahnmed*, volume 104, No. 4, pp. 431-437. The illustrations in FIG. 1 of generally acceptable endrounding, or less desirable or even unacceptable endrounding, are merely for illustrative purposes only. There may be instances where bristle filaments having characteristics that appear to be less desirable based on FIG. 1 are nonetheless acceptable, or good, endrounding characteristics for a particular purpose. Accordingly, the illustrations of FIG. 1 should not be construed to limit the scope of, or define, what is acceptable end rounding.

Because there are often hundreds of bristle filaments in a toothbrush head, and some of the bristles may have an acceptable endrounding and others may not, methods have been established to determine the "levels" of endrounding on a toothbrush. To determine the level of endrounding on a toothbrush, the endrounding of all of the bristle filaments on a toothbrush head are conventionally examined microscopically. Each of the bristle filaments is compared to known endrounding patterns, such as those illustrated in FIG. 1. Based on the particular application a determination is made whether the endrounding of the bristle filament is acceptable for that particular application. Upon visual inspection of each of the bristle filaments, the toothbrush may be assigned to a class, such as for example one of five classes. In one method, class 1 means 80-100% of the bristles have acceptable endrounding. Similarly, class 2 means 60-80% of the bristles have acceptable endrounding. Class 3 means 40-60% of the bristles have acceptable endrounding. Class 4 means 20-40% of the bristles have acceptable endrounding. Class 5 means 0-20% of the bristles have acceptable endrounding. Under this method, all of the bristle filaments of a toothbrush are assessed, and the toothbrush is assigned to a class. While assignment to a class is useful for those in the technical field, it does not provide information that may be provided to consumers in a beneficial way. For example, informing a consumer that 80-100% of a toothbrush's bristles have acceptable endrounding does not have meaning to the average consumer. Similarly, informing the consumer that one toothbrush is three times as gentle as another toothbrush based on microscopic pictures has little practical value.

Figure 2:
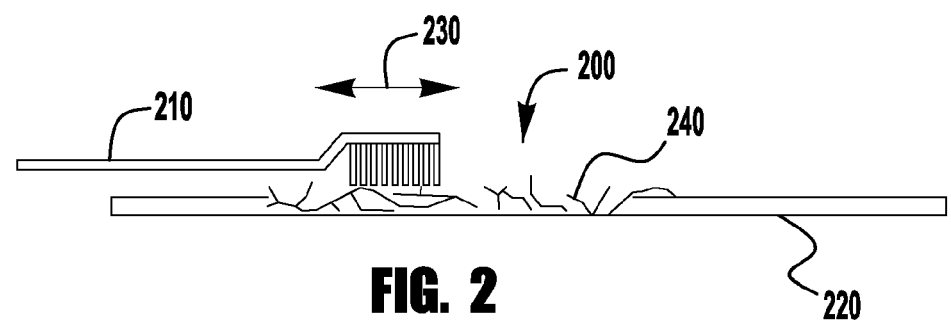
FIG. 2 is an elevational view of a toothbrush brushing a destructible article and creating damage.

FIG. 2 is an illustration 200 of a novel method of assessing the gentleness, or conversely the abrasiveness, of a toothbrush 210. The test method may involve the partial to total destruction 240 of a destructible article 220. In one embodiment, toothbrush 210 is moved back and forth in a linear brushing motion 230 across destructible article 220. The brushing motion or movements may be back and forth linear motions, rotational motions, rotational oscillation motions, linear oscillation motions, combinations of one or more of these motions, or any other repetitive motion. The brushing motion may be obtained manually or mechanically. The brushing motion may result from the toothbrush itself, such as with an electric toothbrush, or with an applicator external to the toothbrush, by a human hand, or a combination thereof.

Destructible article 220 may be any sensitive article that can be damaged or destroyed by brushing with bristles or other cleaning elements of a brush. Non-limiting examples of destructible articles 220 include: a) paper products, such as for example paper napkins and paper towels; b) synthetic materials, such as for example thin foils; c) textiles, such as for example nylons, tights, or silk thread; d) plant leaves; e) skin, such as for example leather or skin of eggs; e) food, such as for example strawberries, peaches, kiwi, other fruits, or chocolate; f) styrofoam; g) sponges; and h) chalk. Preferably the sensitive article has a consistent consistency and density throughout the tested area. In one embodiment, however, destructible article 220 has a skin or outer layer having a fluid under the skin or outer layer, and damage to the destructible article 220 may result in the fluid becoming visible, or escaping, upon damage to the destructible article 220. In yet another embodiment, destructible article 220 has several adjacent layers. Adjacent layers may have different properties, such as, for example, different colors or textures. As each layer of the destructible article 220 is damaged or destroyed, the adjacent layer may become visible and provide a visualization of the degree of damage. Similarly, adjacent layers may contain substances with different properties, such as for example, a yellow liquid may be contained between the first and second layers, and a blue liquid may be contained between the second and third layers. Accordingly, as each layer of the destructible article 220 is damaged or destroyed, the substance contained between succeeding adjacent layers may escape, and thus, the degree of damage becomes visible by the color of fluid that is escaping from the destructible article 220. Optionally, elements of any of the above described embodiments of destructible articles 220 may be combined to provide additional embodiments of destructible articles 220.

Preferably the density of the destructible article 220 is lower than about 1.5 g/cm$^3$. Fruits, such as for example strawberries, cherries, kiwis and oranges, typically have a density of about 1.0+/−0.2 g/cm$^3$ and are suitable destructible articles 220. Strawberries, which have a density of about 1.1 g/cm$^3$, are particularly suitable for certain methods described and claimed herein.

The pressure resistance of a destructible article 220 is the amount of pressure that may be applied to a square millimeter of the article without penetrating the outer layer of the destructible article 220. Pressure resistance was determined using a test body having a diameter of 8 mm and a speed of 10 mm/min. Pressure resistance is equal to the force/area or N/mm$^2$ required to penetrate the outer layer of the destructible article 220. The area [mm$^2$] is equal to $(D^2 [mm^2]*\pi)/4$, wherein D=diameter of the test probe. In one embodiment the pressure resistance of the destructible article 220 is between about 0.02 and 1.00 N/mm$^2$. In testing, the observed pressure resistance of strawberries averaged 0.093 N/mm$^2$, and ranged from 0.065 N/mm² to 0.127 N/mm². Other suitable fruits for forming a destructible article 220 included kiwi, bananas, tomatoes, apples and pears. Apples (including the skin) had the highest pressure resistance of 0.9 N/mm², and ripe peeled banana had the lowest pressure resistance at 0.53 N/mm²

Depending on the gentleness, or conversely the abrasiveness, of the bristles or other cleaning elements, the brushing motion 230 may cause more or less damage 240 to the destructible article 220. Damage 240 is preferably visually observable damage. The damage 240 may be a partial to total destruction of the destructible article 220. In one embodiment, the brushing motion 230 is conducted for a set time and a visual assessment of the damage 240 is conducted. In another embodiment, the amount of time it takes for the brushing motion 230 to cause a certain degree of damage 240 is measured. In yet another embodiment, a brushing motion 230 is conducted until either a set time is reached or a certain degree of destruction 240 of the destructible article 220 is reached, and then an assessment is made of the bristles. In one embodiment, the assessment, for example, may determine the change in bristle filaments, or the amount of residue trapped in the bristle filaments.

The assessment of damage 240 may be based on the type of destructible article 220. If the destructible article 220 is for example a paper napkin, the damage may range from roughing up the surface to wearing through or tearing through the paper napkin. If the destructible article 220 is for example a fruit, such as a strawberry, the damage 240 may range from breaking through the outer layer to creating a hole in the fruit.

Figure 3:
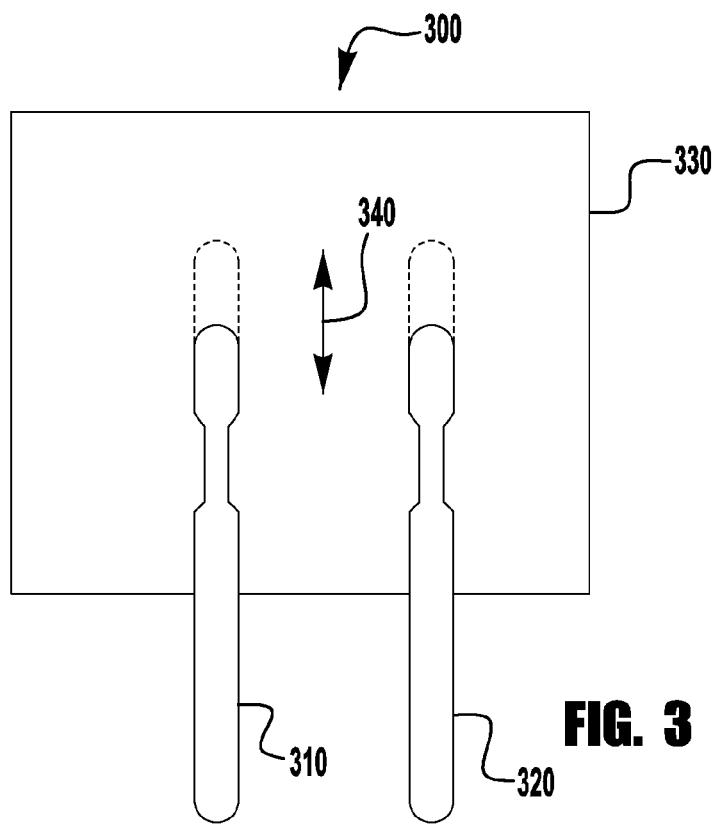
FIG. 3 is a plan view of two toothbrushes brushing a destructible article, the first toothbrush having abrasive bristle filaments, and the second having less abrasive filaments.

FIG. 3 illustrates a gentleness test 300 comparing a first toothbrush 310 with a second toothbrush 320. In this embodiment, both toothbrushes 310 and 320 are moved in a back and forth linear brushing motion 340 on a paper napkin 330. After a set time, the brushing motion 340 is stopped and an assessment of the damage, if any, to the paper napkin 330 is made.

The brushing force, or pressure on the toothbrush head against the paper napkin 330 (or any destructible article) is preferably between about 1.0 N and about 3.0 N. In one embodiment the brushing force is between about 1.5 N and 2.5 N, and in one embodiment the brushing force is about 2.0 N. The same amount of brushing force is applied to the first toothbrush 310 and the second toothbrush 320.

In addition, the toothbrush heads should be positioned on the destructible article 330 so that there is an even pressure distribution across the toothbrush heads. Preferably each toothbrush head is parallel with the destructible article 330, particularly when the destructible article 330 is planar. If the destructible article has a curved surface or curved contact area, such as for example in the case of a strawberry, the test area of the surface is preferably at a location having a relatively small curvature. Preferably the ratio of the test surface area to the radius of the curve is at least about 1.

FIG. 4 illustrates the results 400 of a gentleness test 300 on a paper napkin 330. The first toothbrush 310 caused damage 410 to the paper napkin 330. Damage 410 may be classified, for example, as moderate damage. The second toothbrush 320 caused little to no damage 420 to the paper napkin 330. Damage 420 may be classified, for example, as little to no damage. Based on the method of assessing gentleness 300 it can be determined that the second toothbrush 320 is gentler than the first toothbrush 310 because the first toothbrush 310 caused moderate damage over the set amount of time while the second toothbrush 320 did little to no damage over the same period of time.

For brushes having bristles, factors which are believed to have an effect on abrasion are: bristle stiffness, level of endrounding, type of filaments (e.g. tapered filaments), length of filaments, filament thickness, brush head trim, brushing technique, duration and frequency of brushing, and brushing force. If the bristle configurations of the first and second toothbrushes are substantially the same except for a tested characteristic, however, the method of assessing gentleness 300 is also a method of assessing that characteristic of the bristle filaments. For example, toothbrush bristles filaments with good endrounding are less abrasive than otherwise identical toothbrush bristle filaments with poor endrounding. Accordingly, when comparing two toothbrushes that have substantially the same bristle filament configurations and type of bristles except for endrounding, the toothbrush that is more gentle (i.e. less abrasive) contains a higher percentage of good endrounding of the bristle filaments. Thus, a benchmark having a threshold for a percentage of good endrounding of bristles may be established by, for example, identifying a time for brushing a destructible article without causing a set amount damage to the destructible article. If a test toothbrush brushes the destructible article for that period of time without causing the set amount of damage, it may be assumed that the toothbrush has the same or higher percentage of bristle filaments with good endrounding as a test toothbrush with a known level of endrounding. Other bristle characteristics such as stiffness, type of filaments, length of filaments, filament thickness, brush head trim, and other characteristics and combinations thereof may be similarly tested.

FIGS. 5-9 illustrate a gentleness test comparing two oscillating toothbrush heads on a strawberry. When comparing the gentleness of two toothbrushes on a destructible article, such as for example a strawberry, it is important to ensure that each of the toothbrush heads are tested on strawberries with substantially the same characteristics and consistency. One method of ensuring substantially the same characteristics and consistencies is to determine the state of ripeness of the strawberry by visual inspection based on set botany criteria (such as for example signs for microbial contamination, even coloring over all the fruit, and inspection for traumatized tissue parts). In addition, using strawberries from the same supplier and from the same box may help to avoid bias from variations due to strawberries from different stores and different lots having different characteristics. After examination of the strawberries, the strawberries are cut in half. Preferably, each toothbrush head is tested on one half of the same strawberry. In addition, preferably a number of tests are conducted wherein each toothbrush head is randomly matched with one of the halves of each strawberry.

FIGS. 5A and 5B illustrate a side-by-side snapshot comparison 500 of a gentleness test of two oscillating toothbrush heads 530 and 560 taken at time T1. Strawberry 520 and strawberry 550 are two strawberries with substantially the same characteristics and consistency. Toothbrush head 530 and toothbrush head 560 are oscillated at the same speed and under the same brushing force against their respective strawberries 520, 550.

FIGS. 6A and 6B illustrate a side-by-side snapshot comparison 600 of the gentleness test taken at a time T2, after time T1. Toothbrush head 530 has started to cause observable damage 610 to strawberry 520. The observable damage 610 consists of strawberry juice oozing out around the toothbrush bristle filaments. At time T2 there is no visible damage occurring to strawberry 550.

FIGS. 7A and 7B illustrate a side-by-side snapshot comparison 700 of the gentleness test taken at a time T3, after time T2. Toothbrush head 530 has caused additional observable damage 710 to strawberry 520. The additional observable damage 710 consists of more strawberry juice oozing out around the toothbrush bristle filaments. At time T3 there is still no visible damage occurring to strawberry 550.

Figures 8A, 8B:
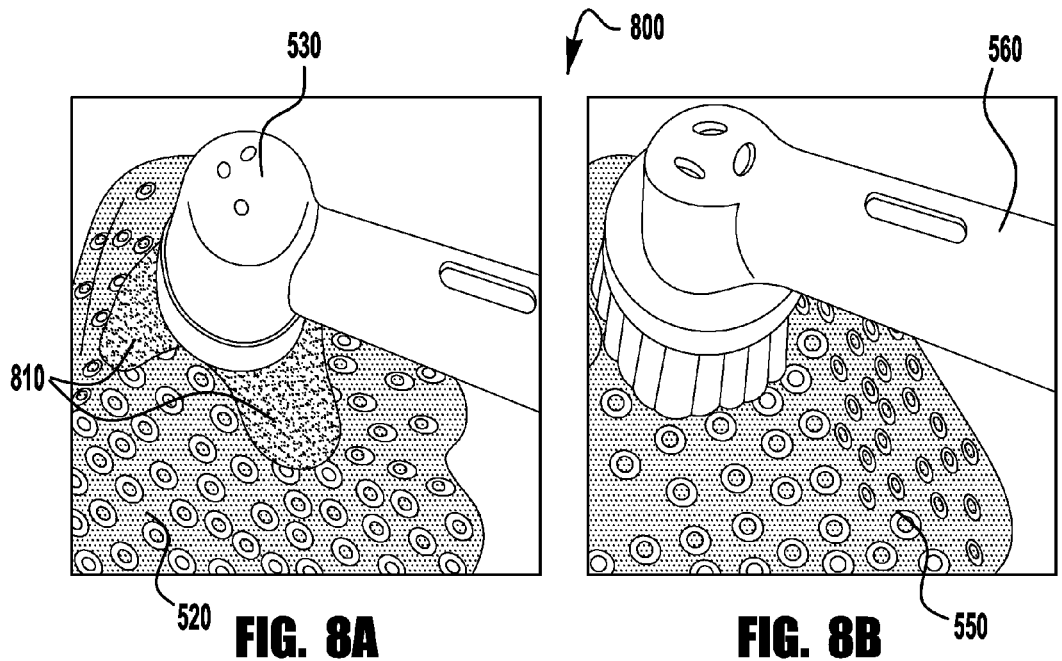

FIGS. 8A and 8B illustrate a side-by-side snapshot comparison 800 of the gentleness test taken at a time T4, after time T3. Toothbrush head 530 has caused further observable damage 810 to strawberry 520. The further observable damage 810 consists of more strawberry juice oozing out around the toothbrush bristle filaments and a noticeable penetration of the toothbrush bristle filaments into the strawberry 520. At time T4 there is still no visible damage occurring to strawberry 550.

Figures 9A, 9B:
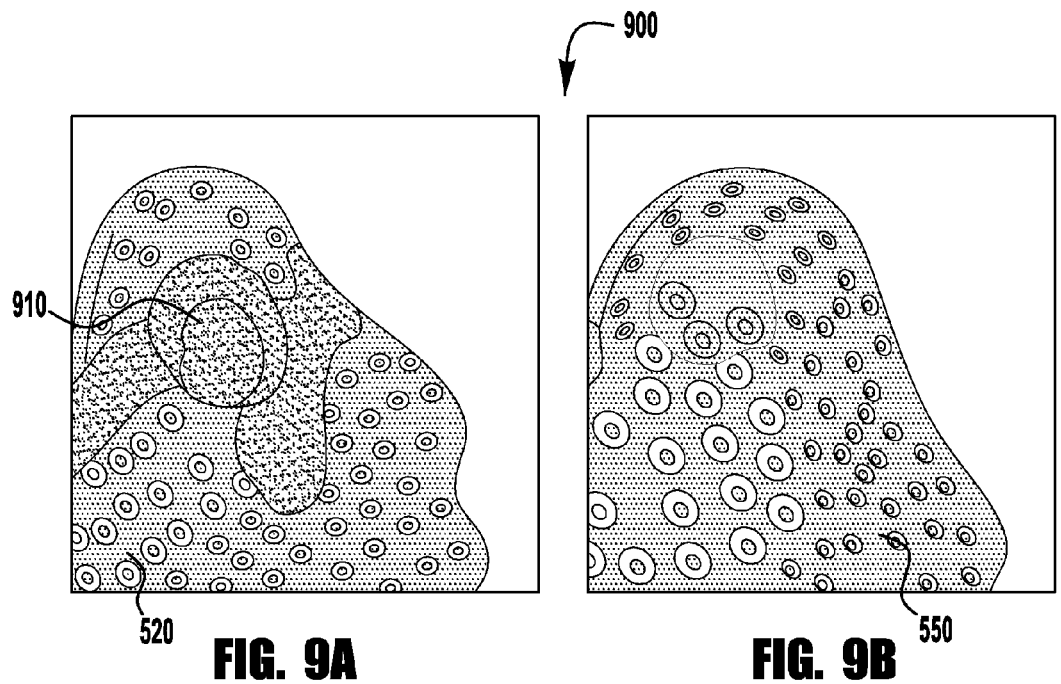
FIG. 9A shows the same strawberry as FIGS. 5A, 6A, 7A, and 8A and demonstrates the damage caused by brushing with the first toothbrush on the first strawberry.
FIG. 9B shows the same strawberry as FIGS. 5B, 6B, 7B, and 8B and demonstrates the lack of damage caused by brushing with the second toothbrush on the second strawberry.

FIGS. 9A and 9B illustrate a side-by-side snapshot comparison 900 showing the results of the gentleness test taken at a time T5, after time T4. Toothbrush heads 530, 560 have been removed. Toothbrush head 530 caused significant observable damage 910 to strawberry 520. The significant observable damage 910 is a hole bored into the strawberry and liquid oozing out around the hole. No substantial visible damage occurring to strawberry 550.

The results from the gentleness test demonstrate that toothbrush head 560 is more gentle, or less abrasive, than toothbrush head 530. For two toothbrush heads having the same bristle filament configuration except for endrounding, such results are also indicative of the endrounding of the bristle filaments. A toothbrush with good endrounding will cause less damage to a destructible article such as the strawberry than a toothbrush with poor end rounding.

This method of demonstrating or assessing the gentleness of a toothbrush provides a repeatable visualization of the gentleness of the toothbrush. This visualization may be readily communicated to a consumer who can visually see the benefits of using the more gentle toothbrush. The visualization may be, for example, a qualitative measurement, a display for consumer education, a close up of the destructible article, a histogram, a line chart, a side-by-side comparison, a tabulation of data, video images, displays, and print adds. Visualizations could also be shown to consumers in the store as part of a display, or other promotional materials.

Figure 10:
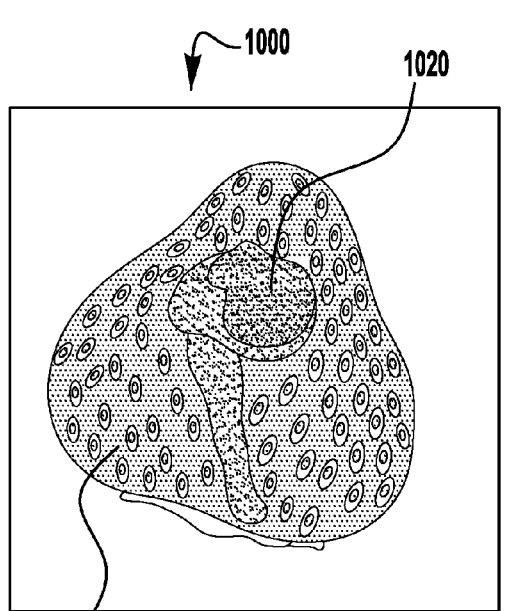
FIG. 10 shows an exemplary illustration of a strawberry damaged by brushing with a toothbrush having abrasive bristle filaments.
Figure 11:
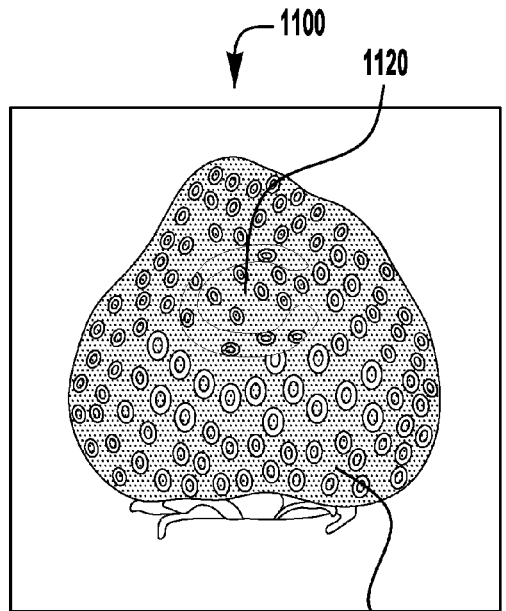
FIG. 11 shows an exemplary illustration of a strawberry with little to no damage caused by brushing with a toothbrush having less abrasive bristle filaments.

In one embodiment, the gentleness test described above is repeated for a set number of times to obtain a statistical certainty that toothbrush head 560 is more gentle, or less abrasive, than toothbrush head 530. The results of the test may be classified as damaged or not damaged and assigned a one or a zero in the statistical analysis. FIG. 10 is an illustration 1000 of a destructible article 1010 that would be classified as "damaged" and assigned a one. The strawberry 1010 has significant visual damage 1020. In contrast, FIG. 11 is an illustration 1100 of a destructible article 1110 that would be classified as "not damaged" and assigned a zero because it sustained little to no damage. After a number of tests are conducted, a simple two variable statistical analysis may be performed to determine which toothbrush was more gentle or less abrasive. Another method may include assigning a range of values, such as 0-5 based on the degree of destruction, to the results of each individual test and then statistically analyze those results.

Figure 12:
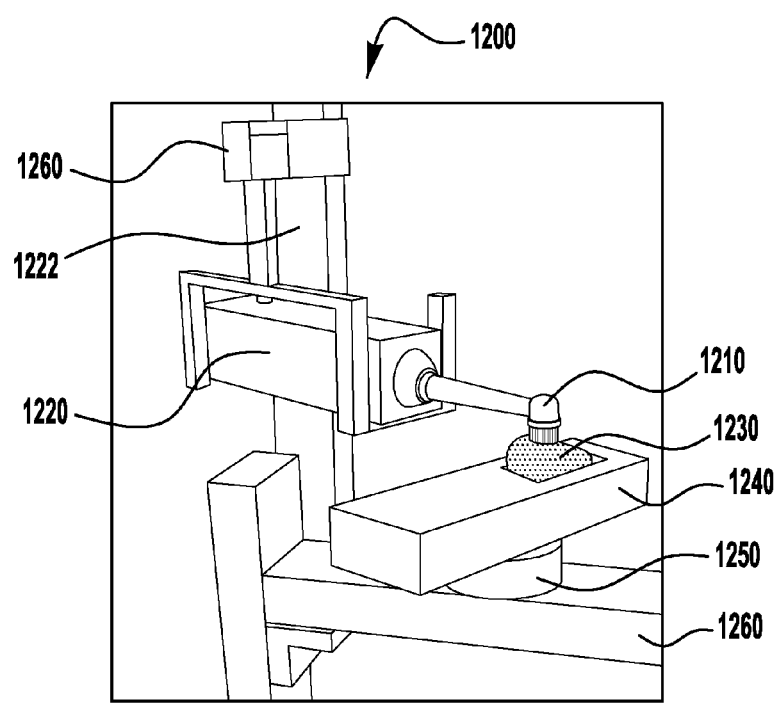
FIG. 12 is a perspective view of an exemplary apparatus for assessing the gentleness of a toothbrush.

FIG. 12 is an embodiment of an apparatus 1200 for assessing the gentleness of a toothbrush. The apparatus 1200 includes a holder 1220 for holding a toothbrush or a toothbrush head, such as for example an electric toothbrush head 1210. Holder 1220 is slidably mounted to rail 1222 and connected to actuator 1260. Actuator 1260 controls the brushing force on the head of toothbrush 1210. Strawberry half 1230 (or any other destructible article) is secured to plate 1230. Plate 1230 is attached to sensor 1250, which is mounted on a base 1260. Sensor 1250 measures the force exerted by toothbrush 1210 on strawberry half 1230 and transmits the force measurement to a controller (not shown). In one embodiment, the controller compares the measured force with a set force, for example 2N, and provides a control signal to actuator 1260. Depending on the control signal, actuator 1260 may adjust, or simply maintain the brushing force applied to toothbrush 1210 keeping the brushing force equal to the set force.

To create a side by side visual demonstration, preferably two separate systems such as two separate apparatuses 1200 are set up side by side. Two separate systems permit separate adjustment of brushing force to each individual toothbrush. Preferably a display is also provided for each system so that an observer may visually observe the actual brushing force applied to each destructible article. Such side by side comparisons with a visual display are useful to effectively communicate the gentleness of a toothbrush to consumers.

Although the embodiments described in detail herein primarily relate to bristles on toothbrushes, the methods and apparatus disclosed herein work equally well with many types of brushes that have bristles, such as for example hairbrushes, nailbrushes, shoe brushes, cloth brushes, or scrub brushes.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. For example, brushing a destructible article with a brush for demonstrating qualities such as distribution of brushing force, or any other bristle characteristic is contemplated herein. Therefore, the invention in its broader aspects is not limited to the specific details, representative apparatus and methods, and illustrative examples shown and described. Accordingly, departures may be made from such details without departing from the spirit or scope of the applicant's general inventive concept.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A method of evaluating the endrounding quality of toothbrush cleaning elements, comprising:
   providing an article having an outer layer and a fluid under the outer layer;

providing a toothbrush, having a plurality of cleaning elements;

brushing the article with the cleaning elements at a predetermined force; and evaluating the article after the article has been brushed to see if there is any damage to the article as a result of the brushing; and comparing the damage to the article as a result of the brushing to a predetermined acceptable level of damage caused to a substantially similar article by brushing with another toothbrush having a selected level of acceptably rounded bristles.

2. The method of claim 1 wherein the article is a paper product.

3. The method of claim 1 wherein the article is one of a synthetic material, a textile, a plant leaf, styrofoam, sponge, and chalk.

4. The method of claim 1 wherein the article is a food.

5. The method of claim 4 wherein the food is a strawberry.

6. The method of claim 1 wherein brushing the article comprises brushing the article for a set period of time under the predetermined force.

7. The method of claim 6 wherein the predetermined force is a force of between about 1 Newton and about 3.5 Newtons.

8. The method of claim 7 wherein the predetermined force is between about 1.5 Newtons and about 2.5 Newtons.

* * * * *